United States Patent
Honda

(10) Patent No.: US 8,891,972 B2
(45) Date of Patent: Nov. 18, 2014

(54) OPTICAL RECEIVING APPARATUS AND OPTICAL TRANSMISSION SYSTEM

(75) Inventor: Toshiki Honda, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 966 days.

(21) Appl. No.: 13/016,777

(22) Filed: Jan. 28, 2011

(65) Prior Publication Data

US 2011/0188854 A1   Aug. 4, 2011

(30) Foreign Application Priority Data

Jan. 29, 2010   (JP) ................. 2010-018227

(51) Int. Cl.
*H04B 10/12*   (2006.01)
*H04B 17/00*   (2006.01)

(52) U.S. Cl.
CPC ..................... *H04B 17/00* (2013.01)
USPC ............ 398/147; 398/152; 398/159

(58) Field of Classification Search
CPC ........ H04B 17/00; H04B 10/60; H04B 10/61; H04B 10/612; H04B 10/614; H04B 10/6151; H04B 10/6161; H04B 10/6162; H04B 10/677; H04B 10/697; H04J 14/06
USPC ......... 398/152, 147, 159, 183, 184, 188, 202, 398/205, 207, 208, 212, 214, 149, 150, 81, 398/203, 204, 209, 213, 33, 25; 359/337.5, 359/352
See application file for complete search history.

(56) References Cited

U.S. PATENT DOCUMENTS 5,905,585 A * 5/1999 Shirai ........................ 398/20
2004/0223769 A1  11/2004 Hoshida

FOREIGN PATENT DOCUMENTS

| JP | 8-321805 | 12/1996 | |
|---|---|---|---|
| JP | 2000-115077 | 4/2000 | |
| JP | 2002-009699 | 1/2002 | |
| JP | 2002-009699 | * 11/2002 | ............ H04B 10/02 |
| JP | 2003-60580 | 2/2003 | |
| JP | 2004-516743 | 6/2004 | |
| JP | 2008-193483 | 8/2008 | |

OTHER PUBLICATIONS

JPO Office action dated Jun. 4, 2013 for corresponding Japanese Patent Application No. 2010-018227, (3 pages).
English Translation of JPO Office action dated Jun. 4, 2013 for corresponding Japanese Patent Application No. 2010-018227, (4 pages), which was previously filed on Sep. 4, 2013.

* cited by examiner

Primary Examiner — M. R. Sedighian
(74) Attorney, Agent, or Firm — Christie, Parker & Hale, LLP

(57) ABSTRACT

An optical receiving apparatus includes a variable dispersion compensation unit, a delay interference unit, a photoelectric converter, a polarization control unit for control the polarization state of an optical signal inputted to the photoelectric converter, a received data processing unit for monitoring the number of error occurrences, and a control unit for controlling the dispersion compensation amount at the variable dispersion compensation unit and the optical phase control amount at the delay interference unit, based on information on the number of error occurrences from the received data processing unit. The control unit adjusts the polarization state of the optical signal inputted to the photoelectric converter to a first polarization state, in which errors are more likely to occur than in normal operation, by controlling the polarization control unit and then starts control of the variable dispersion compensation unit and the delay interference unit, and upon completion of the control, adjusts the polarization state of the optical signal to a second polarization state, in which errors are less likely to occur than in the first polarization state, by controlling the polarization control unit.

8 Claims, 15 Drawing Sheets

FIG. 3
RELATED ART
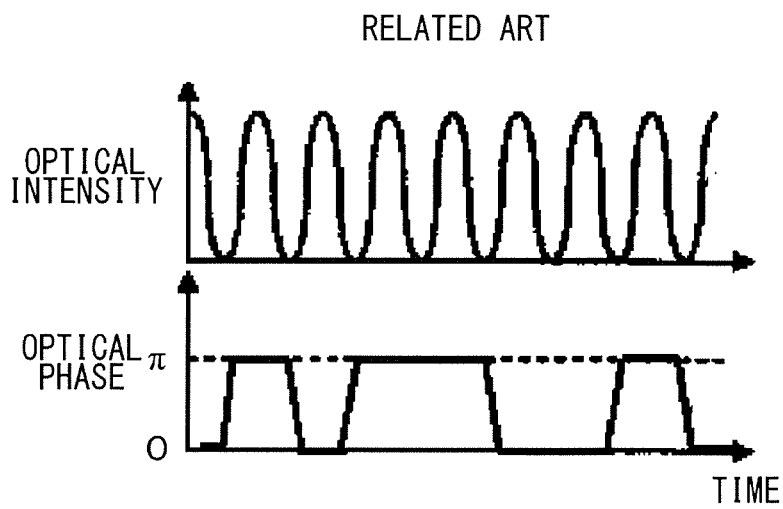
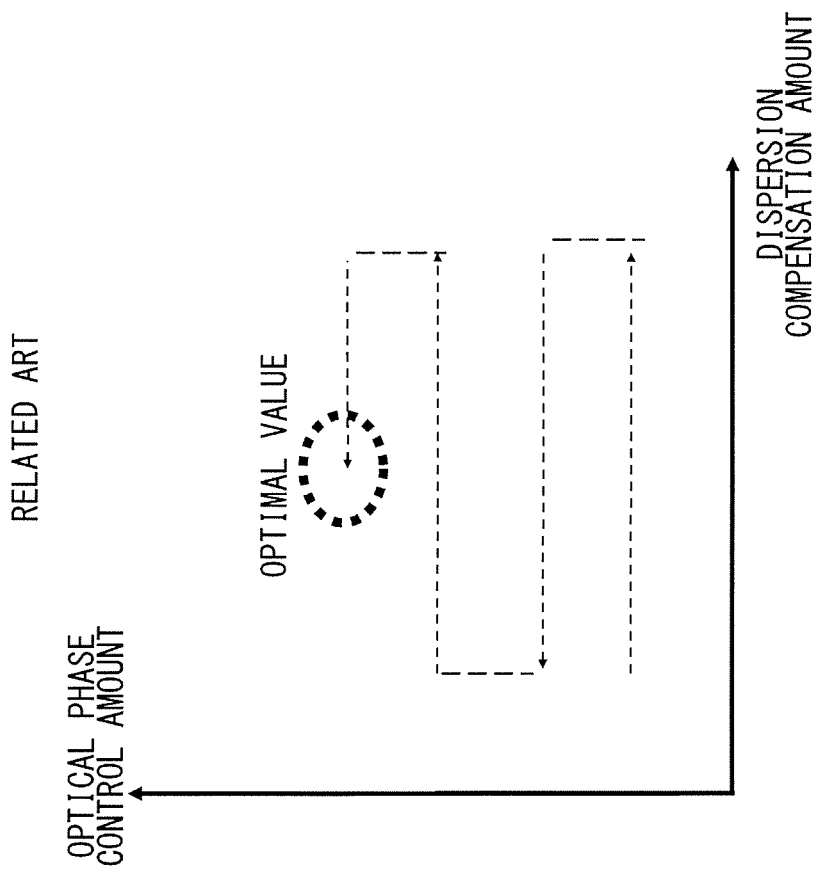
FIG. 4
RELATED ART

OPTICAL RECEIVING APPARATUS AND OPTICAL TRANSMISSION SYSTEM

CROSS-REFERENCE TO RELATED APPLICATION

This application claims priority to and the benefit of Japanese Patent Application Number 2010-018227, filed on Jan. 29, 2010.

BACKGROUND OF THE INVENTION

1. Field of the Invention

The present invention relates to an optical receiving apparatus and an optical transmission system.

2. Description of the Related Art

In recent years, there has been a growing demand for the introduction of next-generation optical transmission systems that can operate at a transmission rate of 40 Gb/s. Moreover, such optical transmission systems are expected to have the transmission distance and frequency usage efficiency equivalent to those of the systems operating at 10 Gb/s. In search of means to fulfill such demand, research-and-development (R&D) efforts are being made actively for the RZ-DPSK (return to zero—differential phase shift keying) or CSRZ-DPSK (carrier-suppressed return to zero—differential phase shift keying) modulation scheme which excels in the OSNR (optical signal-to-noise ratio) tolerance and nonlinearity tolerance compared with the NRZ (non-return to zero) modulation scheme having been employed in conventional systems of 10 Gb/s or below. Also, in addition to the above-mentioned modulation schemes, active R&D is being directed to phase-modulation schemes, such as the RZ-DQPSK (return to zero—differential quadrature phase-shift keying) or the CSRZ-DQPSK modulation scheme, which feature high frequency usage efficiency with narrow spectrum (See Reference (1) and Reference (2) in the following Related Art List, for instance).

FIG. 1 is a block diagram showing an exemplary structure of a conventional optical transmitting apparatus for transmitting optical signals by the use of an RZ-DPSK or CSRZ-DPSK modulation schemes of 43 Gbp/s. FIG. 2 is a block diagram showing an exemplary structure of a conventional optical receiving apparatus that performs receiving processings, such as demodulation, on the optical signals transmitted from the optical transmitting apparatus. In the transmission and receiving of optical signals by the RZ-DPSK or CSRZ-DPSK modulation and demodulation scheme, the optical intensity takes a 43 GHz clock waveform, and information is carried by binary optical phase.

As shown in FIG. 1, an optical transmitting apparatus 110 includes a transmission data processing unit 111, a CW (continuous wave) light source 112, a phase modulator 113, and an LN intensity modulator 114.

The transmission data processing unit 111 is provided with a function as a framer for framing inputted data, a function as an FEC (forward error correction) encoder for adding error correction codes, and a function as a DPSK precoder for performing a coding process reflecting information on a difference between the current code and the 1-bit preceding code. The phase modulator 113 modulates continuous light from the CW light source 112 by coded data fed from the transmission data processing unit 111 and outputs a DPSK-modulated optical signal, which is an optical signal, with constant optical intensity, carrying information on the binary optical phase. FIG. 3 is a graph showing a relationship between the optical intensity and the optical phase of a DPSK-modulated optical signal. The LN intensity modulator 114 performs an RZ-pulsing on the optical signal fed from the phase modulator 113. Note that an optical signal which is RZ-pulsed using a frequency (43 GHz) being the same as the bit rate and a clock driving signal having an amplitude equal to the extinction voltage (Vπ) is referred to as an RZ-DPSK signal. Note also that an optical signal which is RZ-pulsed using a frequency (21.5 GHz) being half of the bit rate and a clock driving signal having an amplitude twice as large as the extinction voltage (Vπ) is referred to as a CSRZ-DPSK signal. The optical signal RZ-pulsed by the LN intensity modulator 114 is transmitted to an optical transmission path 101.

Also, an optical receiving apparatus 120 shown in FIG. 2, which is connected to the optical transmitting apparatus 110 via the optical transmission path (optical fiber) 101, performs receiving processings on the (CS)RZ-DPSK signal. As shown in FIG. 2, the optical receiving apparatus 120 includes a VDC (variable dispersion compensator) 121, an optical amplifier 122, a delayed interferometer 123, a photoelectric converter 124, a reproduction unit 125, a received data processing unit 126, and a control unit 127. The optical receiving apparatus 120 performs a highly precise wavelength dispersion compensation by the variable dispersion compensator 121 disposed at the input end thereof because the wavelength dispersion tolerance in 43 Gb/s transmissions is only about 1/16 of that in 10 Gb/s transmissions.

The variable dispersion compensator 121 performs wavelength dispersion compensation on the (CS)RZ-DPSK signal sent through the optical transmission path 101. The optical amplifier 122 amplifies the power of the optical signal outputted from the variable dispersion compensator 121 to a predetermined level so as to compensate for the loss of light at the variable dispersion compensator 121 and outputs the amplified optical signal to the delayed interferometer 123. The delayed interferometer 123, which may be a Mach-Zehnder interferometer, for instance, produces two optical outputs from the inputted signal through an interference (delay interference) in which a component delayed by one bit time (23.3 ps in this case) and a component having been subjected to a 0-rad optical phase control are interfered with each other. That is, one of branch waveguides, which constitutes the Mach-Zehnder interferometer, is so formed as to be a propagation length, equal to 1 bit time, longer than the other of the branch waveguides. The photoelectric converter 124 is structured by a dual-pin photodiode that performs a differential photoelectric conversion detection (balanced detection) by receiving the two optical outputs from the delayed interferometer 123. The reproduction unit 125 extracts a data signal and a clock signal from the received signal which has undergone a balanced detection by the photoelectric converter 124. The received data processing unit 126 performs signal processings, such as error correction, based on the data signal and the clock signal extracted by the reproduction unit 125. The control unit 127 monitors the number of error occurrences detected in the error correction process at the received data processing unit 126 and performs a feedback control of the variable dispersion compensator 121 and the delayed interferometer 123 in such a manner as to minimize the number of error occurrences.

As a conventional technology related to the control of the variable dispersion compensator in an optical transmission system employing an optical modulation scheme such as (CS)RZ-DPSK, Reference (3) in the following Related Art List discloses a technology for monitoring the quality of optical signals without a demodulation process of received optical signals. Also disclosed in Reference (4) and Reference (5) in the following Related Art List, for example, are technologies for optimizing through a feedback control of the variable dispersion compensators or the like provided in the transmission, relay, and receiving sections, based on the transmission characteristics measured at the receiving end.

RELATED ART LIST (1) Japanese Unexamined Patent Application Publication No. 2003-60580.
(2) Japanese Unexamined Patent Application Publication No. 2004-516743.
(3) United States Patent Application Publication No. U.S. 2004/0223769.
(4) Japanese Unexamined Patent Application Publication No. Hei08-321805.
(5) Japanese Unexamined Patent Application Publication No. 2000-115077.

As described above, the conventional optical receiving apparatuses require an optimization control on not only the optical phase control amount at the delayed interferometer but also the dispersion compensation amount at the variable dispersion compensator based on the number of error occurrences monitored on the demodulated electrical signal, if the received optical signals employing a (CS)RZ-D(Q)PSK modulation scheme at an ultrahigh bit rate of 40 Gb/s, for instance, are to be processed.

However, the characteristics of wavelength dispersion compensation amount and the characteristics of optical phase control amount in relation to the number of error occurrences of received signals are different in nature from each other. At the stage of initial setting, therefore, it is necessary to search for optimal control amounts for both because the variable dispersion compensator and the delayed interferometer then are both set apart from the optimal values of their respective control amounts. And the problem is that the search takes a relatively long time and therefore the control amounts for the delayed interferometer and the variable dispersion compensator cannot be stabilized quickly.

FIG. 4 shows an example of a search for optimal control amounts for a variable dispersion compensator and a delayed interferometer in a conventional optical receiving apparatus. In this example, an optimal control amount for both the devices is found in the dashed circle through alternate adjustments of the dispersion compensation amount for the variable dispersion compensator and the optical phase control amount for the delayed interferometer.

FIG. 5 shows an example of relationship between the dispersion compensation amount for the variable dispersion compensator, the optical phase control amount for the delayed interferometer, and the number of error occurrences of received signals. As is evident from the graph, the optimal point where the number of error occurrences of received signals becomes the smallest changes in dependence on both the dispersion compensation amount and the optical phase control amount, and therefore it is necessary to search for optimal points for both the dispersion compensation amount and the optical phase control amount.

FIG. 6 is a graph by which to explain the problem with the optimization control for a conventional optical receiving apparatus. When a search for an optimal point for each of the dispersion compensation amount and the optical phase control amount is made using received signals with an excellent OSNR state in normal operation, there is a wide range of control amount (dispersion compensation amount or optical phase control amount) where the error rate is at or below a predetermined level ($1\times10^{-12}$). In other words, there are many points of control amount that can realize the error rates of $1\times10^{-12}$ or below. In FIG. 6, the optimal point is point P where the error rate is the lowest. However, since it takes a long time to measure an error rate so low as $1\times10^{-12}$ (e.g., 25 seconds to measure the error rate of $1\times10^{-12}$ for received signals of 40 Gb/s), at least several minutes are required to find the optimal point P within the range of control amount where the error rate is $1\times10^{-12}$ or below. Without giving ample time to the search, it is possible that the search will end by erroneously determining point P' away from the real optimal point P as the optimal point. If the control amount is set at point P' away from the real optimal point P, then the apparatus will fail to accomplish its primary performance when the OSNR deteriorates. On the other hand, giving too much time to the search for the optimal point may possibly result in longer time for recovery when the system should develop some trouble.

Moreover, the ultrahigh-speed optical transmission at 40 Gb/s, for instance, poses a problem of polarization mode dispersion (PMD). FIG. 7 is a diagram by which to explain the polarization mode dispersion. The optical fiber should ideally be axisymmetrically circular. In actuality, however, it is subject to birefringence under stress from incomplete manufacturing and processes of coating and cable formation. As a result, the light having passed through a birefringent optical fiber comes out as an output light having a squashed and broadened spectrum as shown in FIG. 7. This is due to the two orthogonal polarization mode components progressing at different propagation speeds within the optical fiber. And the time difference of the two orthogonal polarization mode components on the time axis is called a differential group delay (DGD). The DGD is not a property that is determined uniquely by the manufacture of optical fiber, but a parameter that changes with time depending on the changes in temperature and humidity as well as the tension to the optical fiber. If the DGD becomes large, the distinction between neighboring signals becomes obscure, making it difficult to identify and reproduce signals correctly.

SUMMARY OF THE INVENTION

The present invention has been made in view of the foregoing circumstances, and a purpose thereof is to provide an optical receiving apparatus and an optical transmission system capable of controlling the dispersion compensation amount and the optical phase control amount in a short time while reducing the effects of polarization mode dispersion.

In order to resolve the above-described problems, an optical receiving apparatus according to one embodiment of the present invention comprises: a variable dispersion compensation unit configured to compensate for a wavelength dispersion of an inputted optical signal of a differential M-phase modulation scheme, where M=2n and n is a natural number; a delay interference unit configured to perform a delay interference process on the optical signal dispersion-compensated by the variable dispersion compensation unit, the delay interference process causing interference between a branch component delayed by one bit and an optical-phase-controlled branch component; a photoelectric converter configured to perform an photoelectric conversion on the optical signal from the delay interference unit, so as to output a demodulated electrical signal corresponding to the differential M-phase modulation scheme; a polarization control unit configured to control a polarization state of the optical signal inputted to the photoelectric converter; an error monitor unit configured to monitor the number of error occurrences of the electrical signal outputted from the photoelectric converter; and a control unit configured to control a dispersion compensation amount at the variable dispersion compensation unit and an optical phase control amount at the delay interference unit, based on information on the number of error occurrences from the error monitor unit. The control unit adjusts the polarization state of the optical signal inputted to the photoelectric converter to a first polarization state, in which errors are more likely to occur than in normal operation, by controlling the polarization control unit and then starts control of the variable dispersion compensation unit and the delay interference unit, and upon completion of the control, adjusts the polarization state of the optical signal to a second polarization state, in which errors are less likely to occur than in the first polarization state, by controlling the polarization control unit.

By employing this embodiment, the state in which errors are more likely to occur than in normal operation is created purposely, and in such the state the dispersion compensation amount and the optical phase control amount are optimized. Thus, the monitoring time of errors in the error monitor unit can be shortened. The dispersion compensation amount and the optical phase control amount are parameters dependent on the characteristics of the optical transmission path connected to the optical receiving apparatus, for instance. Thus, even though the polarization state of the optical signal inputted to the photoelectric converter in the optical receiving apparatus is varied, each optical value does not change. Hence, the dispersion compensation amount and the optical phase control amount can be controlled in a short time. Also, after completing the control of the dispersion compensation amount and the optical phase control amount, the polarization state of the optical signal is controlled again, so that the adverse effect of the polarization mode dispersion can be suppressed.

Another embodiment of the present invention relates to an optical transmission system. The optical transmission system comprises: an optical transmitting apparatus configured to generate an optical signal of a differential M-phase modulation scheme and output the generated optical signal to an optical transmission path, where M=2n and n is a natural number; and an optical receiving apparatus configured to perform receiving processing on the optical signal transmitted through the optical transmission path, the optical receiving apparatus including: a variable dispersion compensation unit configured to receive the input of the optical signal transmitted through the optical transmission path and compensate for a wavelength dispersion of the inputted optical signal; a delay interference unit configured to perform a delay interference process on the optical signal dispersion-compensated by the variable dispersion compensation unit, the delay interference process causing interference between a branch component delayed by one bit and an optical-phase-controlled branch component; a photoelectric converter configured to perform a photoelectric conversion on the optical signal from the delay interference unit, so as to output a demodulated electrical signal corresponding to the differential M-phase modulation scheme; a polarization control unit configured to control a polarization state of the optical signal inputted to the photoelectric converter; an error monitor unit configured to monitor the number of error occurrences of the electrical signal outputted from the photoelectric converter; and a control unit configured to control a dispersion compensation amount at the variable dispersion compensation unit and an optical phase control amount at the delay interference unit, based on information on the number of error occurrences from the error monitor unit. The control unit adjusts the polarization state of the optical signal inputted to the photoelectric converter to a first polarization state, in which errors are more likely to occur than in normal operation, by controlling the polarization control unit and then starts control of the variable dispersion compensation unit and the delay interference unit, and upon completion of the control, adjusts the polarization state of the optical signal to a second polarization state, in which errors are less likely to occur than in the first polarization state, by controlling the polarization control unit.

By employing this embodiment, the state in which errors are more likely to occur than in normal operation is created purposely, and in such the state the dispersion compensation amount and the optical phase control amount are optimized. Thus, the monitoring time of errors in the error monitor unit can be shortened, so that the dispersion compensation amount and the optical phase control amount can be controlled in a short time. Also, After completing the control of the dispersion compensation amount and the optical phase control amount, the polarization state of the optical signal is controlled again, so that the adverse effect of the polarization mode dispersion can be suppressed.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 3 is a graph showing a relationship between the optical intensity and the optical phase of a DPSK-modulated optical signal;

FIG. 4 shows an example of a search for optimization control of a variable dispersion compensator and a delayed interferometer in a conventional optical receiving apparatus;

DETAILED DESCRIPTION OF THE INVENTION

The invention will now be described by reference to the preferred embodiments. This does not intend to limit the scope of the present invention, but to exemplify the invention.

The invention will now be described based on preferred embodiments with reference to the accompanying drawings. Note that like numbers refer to like elements throughout.

Figure 8:
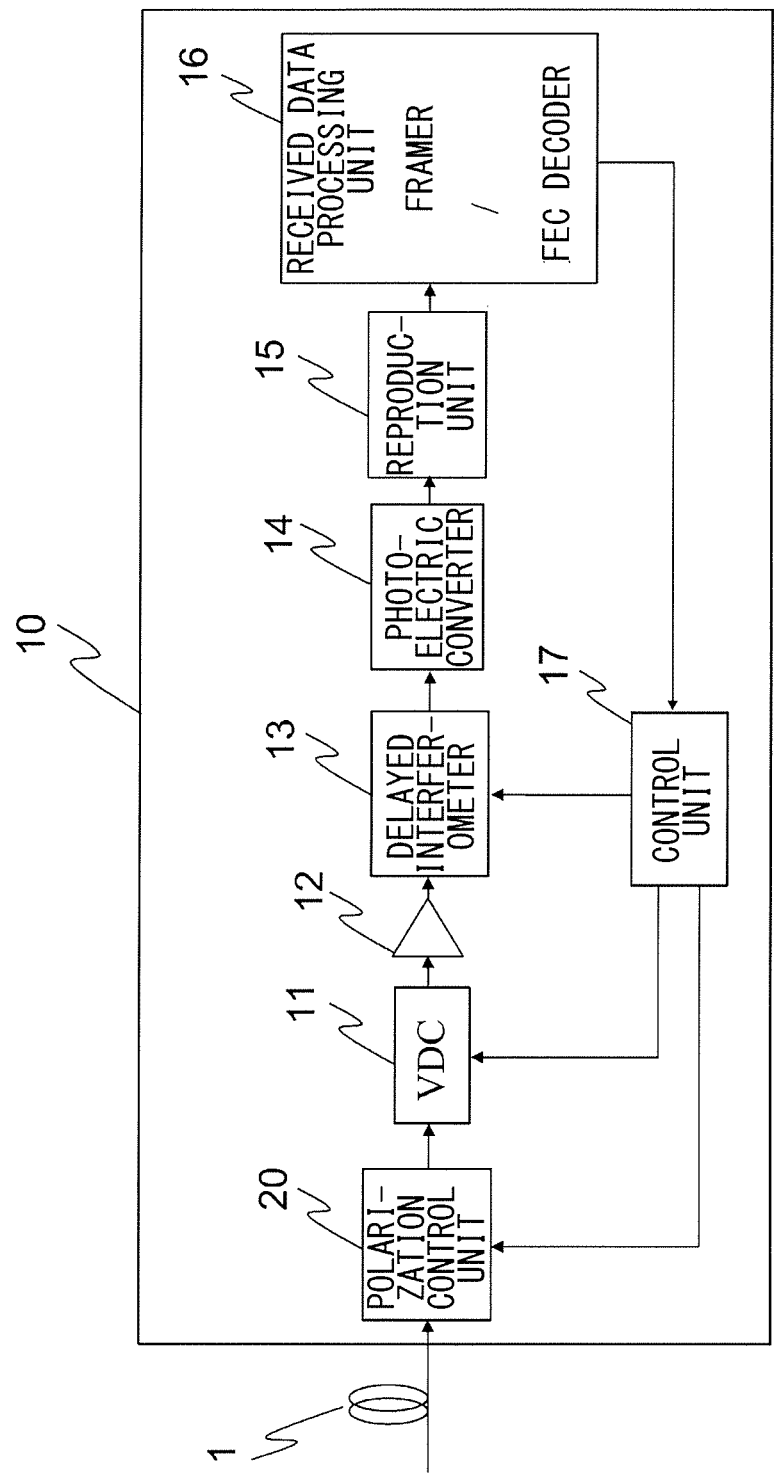
FIG. 8 is a block diagram showing a structure of an optical receiving apparatus according to a first embodiment of the present invention.

FIG. 8 is a block diagram showing a structure of an optical receiving apparatus 10 according to a first embodiment of the present invention.

Figure 1:
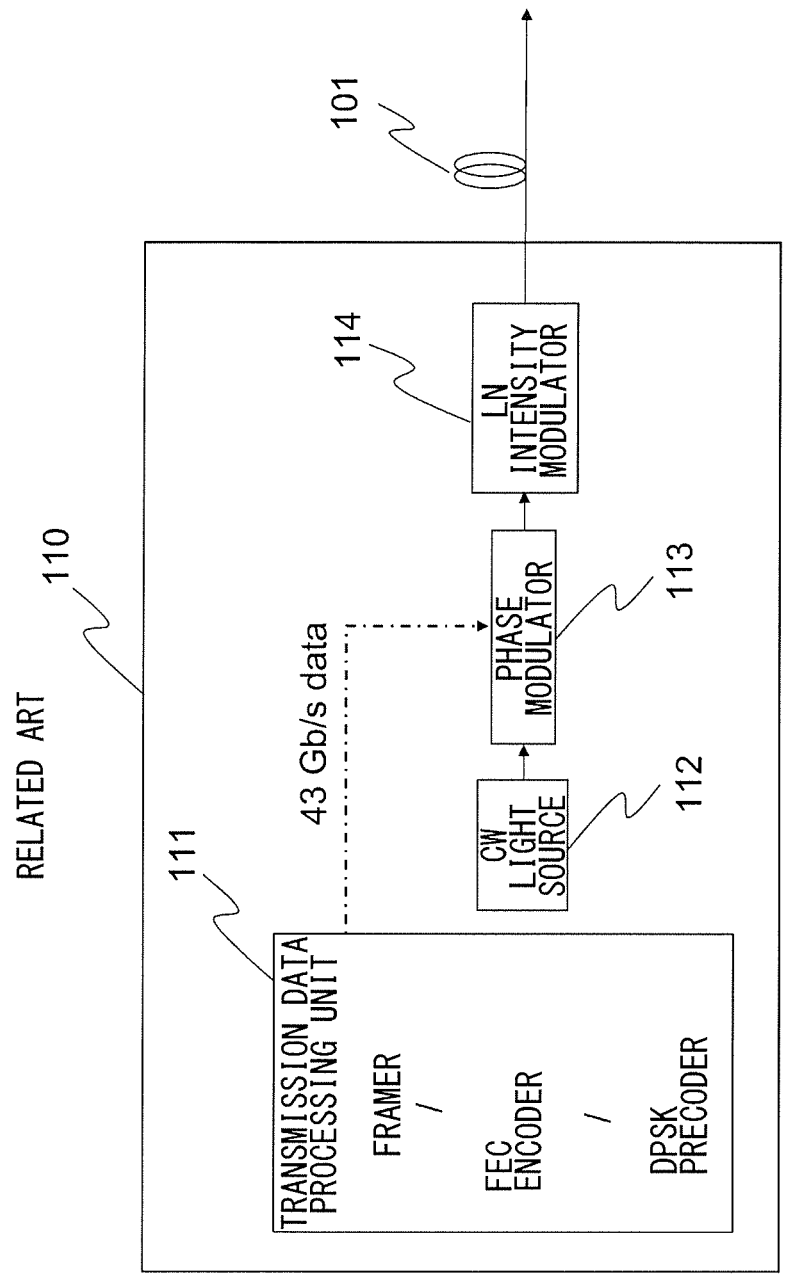
FIG. 1 is a block diagram showing an exemplary structure of a conventional optical transmitting apparatus.
Figure 2:
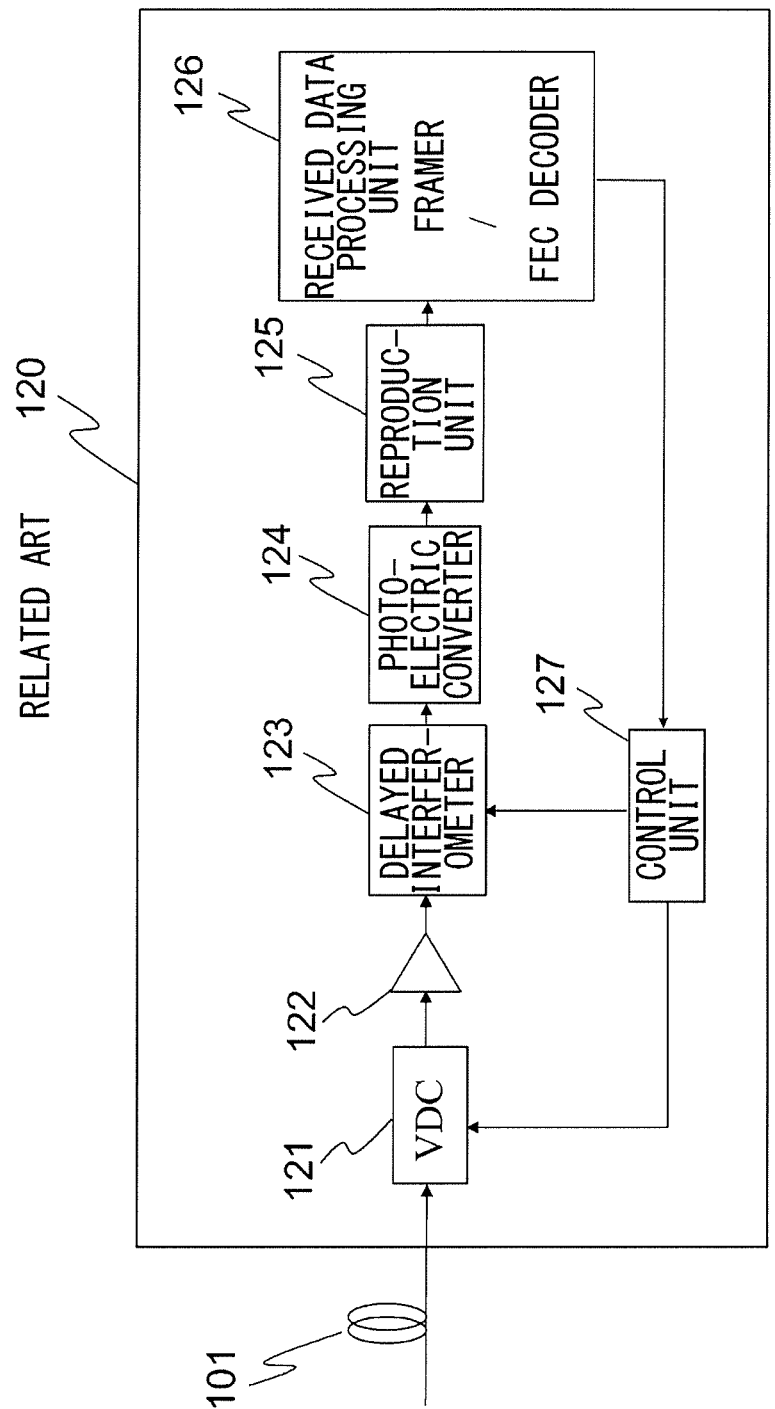
FIG. 2 is a block diagram showing an exemplary structure of a conventional optical receiving apparatus.
Figure 5:
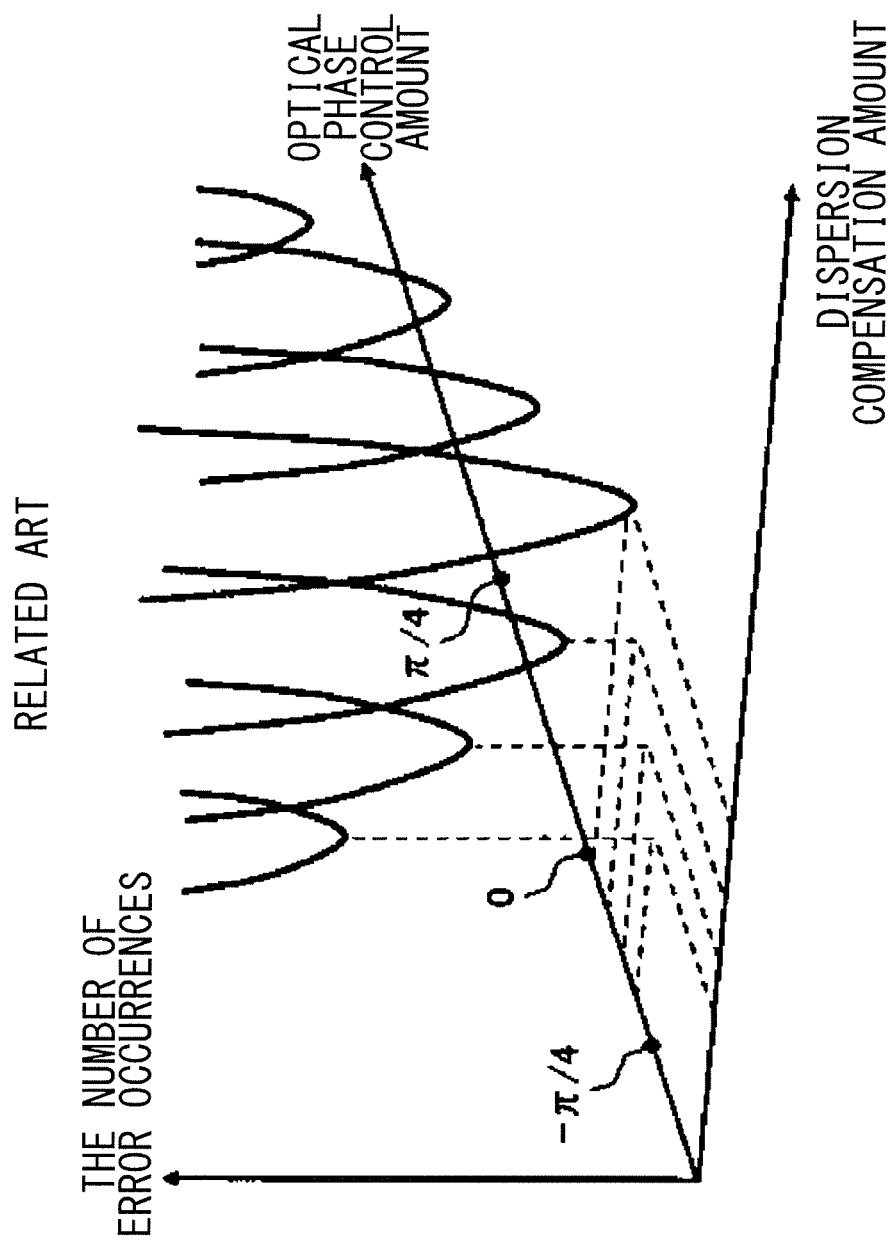
FIG. 5 shows an example of relationship between the dispersion compensation amount for a variable dispersion compensator, the optical phase control amount for a delayed interferometer, and the number of error occurrences of received signals in a conventional optical receiving apparatus.
Figure 6:
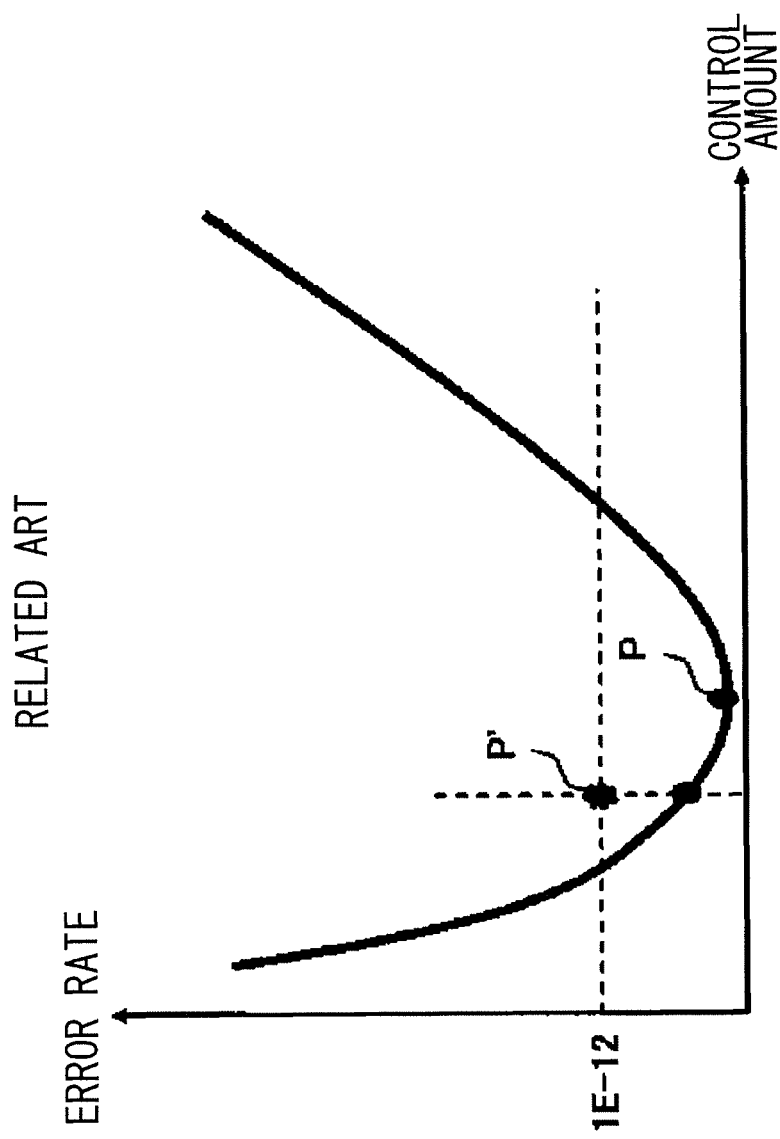
FIG. 6 is a graph by which to explain a problem with the optimization control for a conventional optical receiving apparatus.

As shown in FIG. 8, the optical receiving apparatus 10 according to the first embodiment includes a polarization control unit 20, a variable dispersion compensator (VDC) 11, an optical amplifier 12, a delayed interferometer 13, a photoelectric converter 14, a reproduction unit 15, a received data processing unit 16, and a control unit 17. The optical receiving apparatus 10 in the present embodiment differs from the conventional optical receiving apparatus 120 as shown in FIG. 2 in that the polarization control unit 20 is added before the variable dispersion compensator 11 and that the control unit 17 controls the polarization control unit 20 in addition to the variable dispersion compensator 11 and the delayed interferometer 13.

The optical receiving apparatus 10 receives an optical signal transmitted via an optical transmission path 1 from an optical transmitting apparatus (not shown). This optical signal is an optical signal having been subjected to a differential M-phase modulation of M=2n where n is a natural number. This signal may also be a pulsed optical signal having been subjected to an intensity modulation in addition to the differential M-phase modulation. More specifically, the optical signal to be inputted to the optical receiving apparatus 10 may be an optical signal of DPSK or (CS)RZ-DPSK modulation scheme corresponding to M=2 or DQPSK or (CS)RZ-DQPSK modulation scheme corresponding to M=4.

The polarization control unit 20 receives an optical signal through the optical transmission path 1, controls the polarization state of the optical signal, and outputs the controlled signal to the variable dispersion compensator 11. The control of the polarization state at the polarization control unit 20 is performed by the control unit 17.

The variable dispersion compensator 11, which is disposed subsequent to the polarization control unit 20, receives the optical signal whose polarization state is controlled by the polarization control unit 20. The variable dispersion compensator 11 is a well-known optical device that compensates for the wavelength dispersion accumulated in the inputted optical signal. For example, a VIPA (virtually-imaged-phased-array) device or an optical device using FBG (fiber-bragg-grating) may be used as the variable dispersion compensator 11. The dispersion compensation amount at the polarization control unit 20 is variably controlled by the control unit 17.

The optical amplifier 12, which is disposed subsequent to the variable dispersion compensator 11, receives the optical signal outputted from the variable dispersion compensator 11. The optical amplifier 12 compensates for the loss of light at the variable dispersion compensator 11 by amplifying the inputted optical signal.

The delayed interferometer 13, which is disposed subsequent to the optical amplifier 12, receives the optical signal amplified by the optical amplifier 12. The delayed interferometer 13, which may be a Mach-Zehnder interferometer, for instance, separates the inputted optical signal into two branches. Further, the delayed interferometer 13 delays one of the branches by 1 bit time and gives the other a phase of optical phase control amount Δφ, thereby causing an interference between the optical component delayed by one bit time and the optical component phase-shifted by optical phase control amount Δφ. For the receiving of a normal optical signal, it is necessary to set this optical phase control amount Δφ to an optimal value.

The photoelectric converter 14, which is disposed subsequent to the delayed interferometer 13, receives the optical signal outputted from the delayed interferometer 13. The photoelectric converter 14 performs differential photoelectric conversion detection (balanced detection) by having a dual-pin photodiode receive the optical signal outputted from the delayed interferometer 13. Also, the reproduction unit 15 extracts a data signal and a clock signal from the received signal which has been subjected to the balanced detection by the photoelectric converter 14.

Further, the received data processing unit 16 performs signal processings, such as error correction, based on the data signal and the clock signal extracted by the reproduction unit 15, and at the same time outputs the number of error occurrences detected in the error correction process to the control unit 17.

The control unit 17 controls the polarization control unit 20, the variable dispersion compensator 11, and the delayed interferometer 13. At the startup of the apparatus or the like, the control unit 17 controls the polarization control unit 20 in such a manner as to adjust the polarization state of the optical signal to a polarization state most likely to cause errors and then starts an optimization control for the variable dispersion compensator 11 and the delayed interferometer 13. Then, upon completion of the optimization control, the control unit 17 controls the polarization control unit 20 in such a manner as to adjust the polarization state of the optical signal to a polarization state least likely to cause errors. And in normal operation after the startup of the apparatus, the control unit 17 controls the polarization control unit 20 in such a manner as to maintain the polarization state least likely to cause errors.

Figure 9:
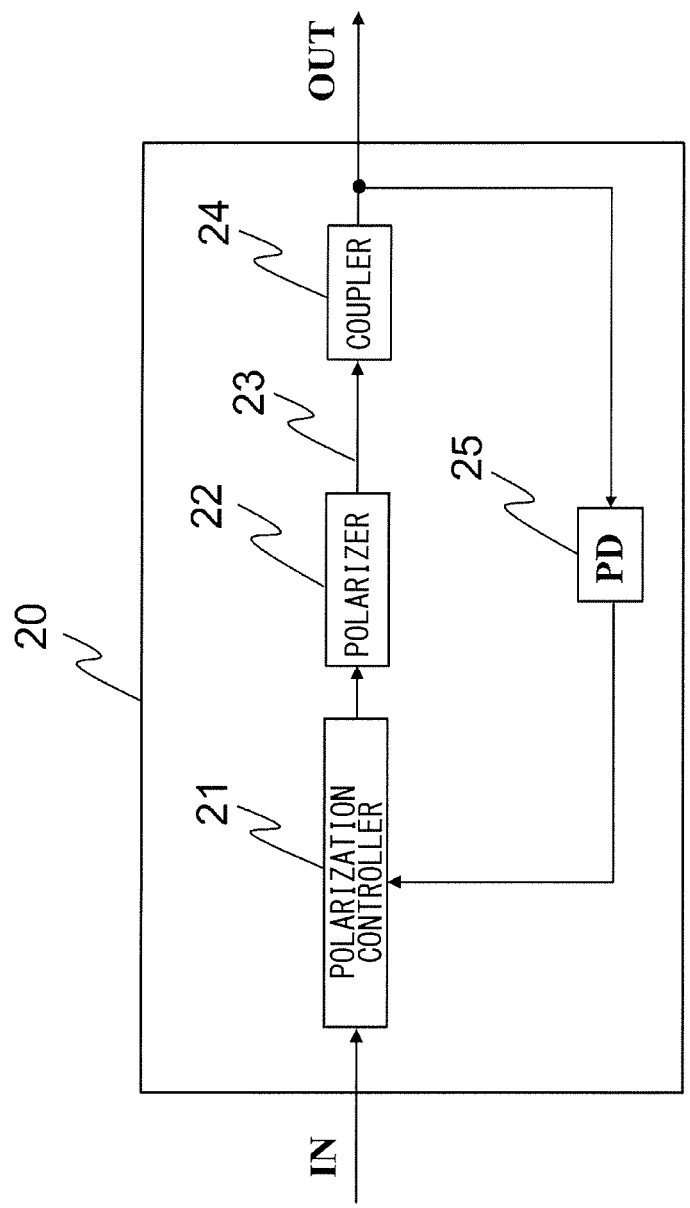
FIG. 9 is a block diagram showing a structure of a polarization control unit.

FIG. 9 is a block diagram showing a structure of the polarization control unit 20. As shown in FIG. 9, the polarization control unit 20 includes a polarization controller 21, a polarizer 22, a polarization-maintaining optical fiber 23, a coupler 24, and a photodiode (PD) 25.

The polarization controller 21 is a device capable of converting the polarization state of the inputted optical signal into an arbitrary polarization state. The polarization controller 21 usable may be one that rotates the polarization plane by giving stress to the fiber by bending or squeezing it or heating it with a heater, for instance.

The polarizer 22, which is disposed subsequent to the polarization controller 21, receives the optical signal outputted from the polarization controller 21. The polarizer 22 allows the passage of one of the two orthogonal polarization components of the inputted optical signal. The optical signal outputted from the polarizer 22 is inputted to the polarization-maintaining optical fiber 23 that can propagate the optical signal while maintaining its polarization state.

The optical signal propagated by the polarization-maintaining optical fiber 23 is separated into two branches by the coupler 24 at a predetermined branching ratio. One of the branched optical signals is outputted to a subsequent optical device (the variable dispersion compensator 11 in this embodiment). The other of the branched optical signals is outputted to the photodiode 25.

The photodiode 25 converts the inputted optical signal into an electrical signal and outputs the electrical signal to the polarization controller 21. The magnitude of this electrical signal represents the power of the optical signal having passed through the polarizer 22. In other words, the photodiode 25 functions as an optical power monitor monitoring the power of the optical signal having passed through the polarizer 22. If the polarization state of the optical signal is changed in various ways by controlling the polarization controller 21, the power that is monitored by the photodiode 25 will change in various ways between the maximum value and the minimum value.

Figure 7:
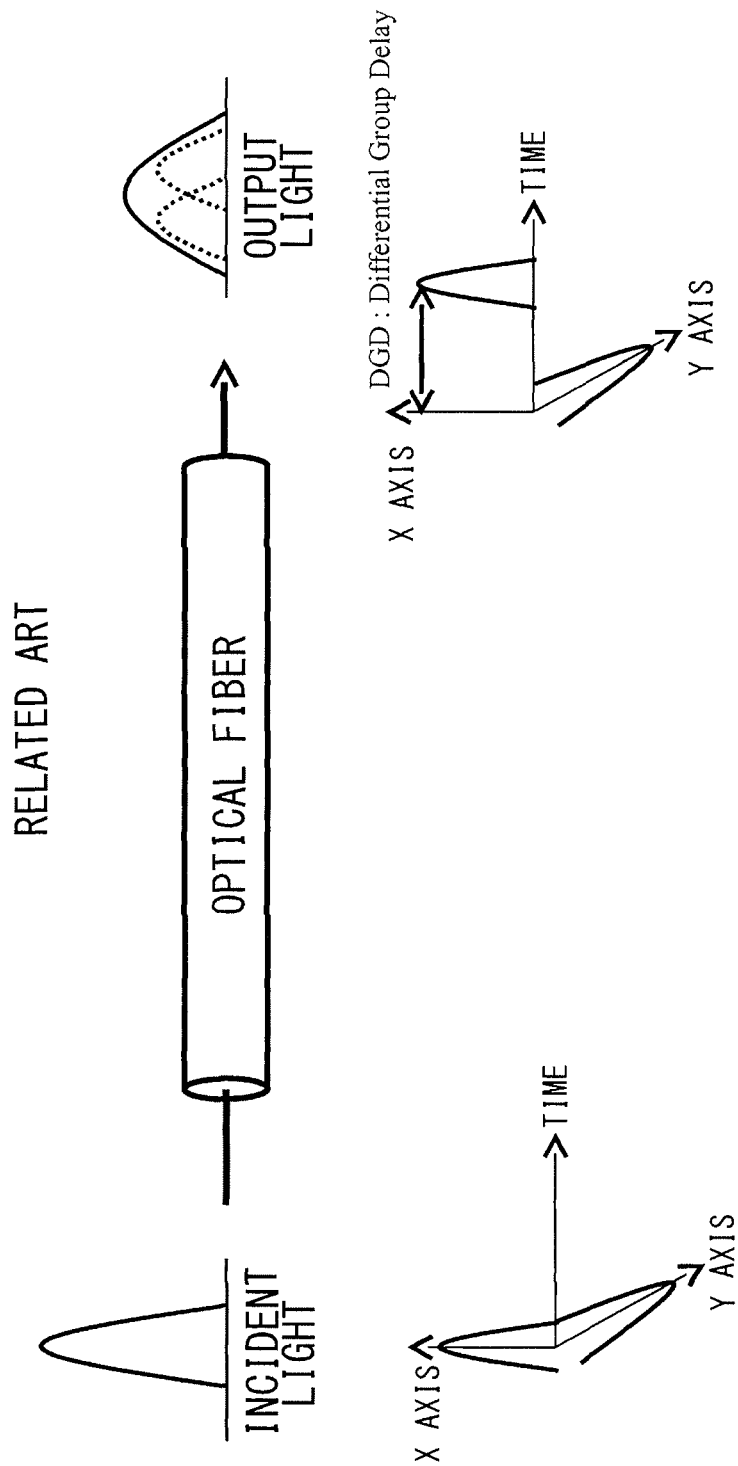
FIG. 7 is a diagram by which to explain a polarization mode dispersion.

The waveform degradation due to polarization mode dispersion becomes the greatest when the orthogonal polarization components are propagated at 1:1 allocation. Yet, even when the output light has a broadened spectrum as shown in FIG. 7, cutting down either one of the orthogonal polarization components will reduce the spread of the spectrum and make the impact of polarization mode dispersion smaller. Using this characteristic, it is possible to create a polarization state most likely to cause errors when the power monitored by the photodiode 25 is the largest and conversely a polarization state least likely to cause errors when the power is the smallest.

According to the experiments conducted by the inventor, the number of error occurrences when the polarization controller 21 is controlled in such a manner as to maximize the power to be monitored by the photodiode 25 is about 100 times that when it is controlled to minimize it. This suggests that, in the case of an optical signal at a transmission rate of 40 Gb/s, an error occurs once in 2.5 sec when the power monitored is the smallest, whereas an error occurs once in 25 msec when the power monitored is the largest. In other words, since the number of error occurrences countable in a fixed length of time can be increased, it is possible to shorten the time that is required in monitoring errors during the optimization control of the dispersion compensation amount and the optical phase control amount.

Now a detailed description will be given of an example of specific control by the control unit 17 by referring to the flowcharts of FIG. 10 and FIG. 11.

With the optical receiving apparatus 10 of a structure as described above, the control unit 17 first controls the polarization controller 21 in such a manner as to maximize the power to be monitored by the photodiode 25 at the start of the apparatus with power turned on (S10). As a result, the polarization state of the optical signal inputted to the photoelectric converter 14 is controlled into the polarization state most likely to cause errors.

Next, the control unit 17 searches for the respective optimal points by repeating through coarse adjustment and fine adjustment of the dispersion compensation amount for the variable dispersion compensator 11 and the optical phase control amount for the delayed interferometer 13 while monitoring the state of error occurrences (S12).

Figure 11:
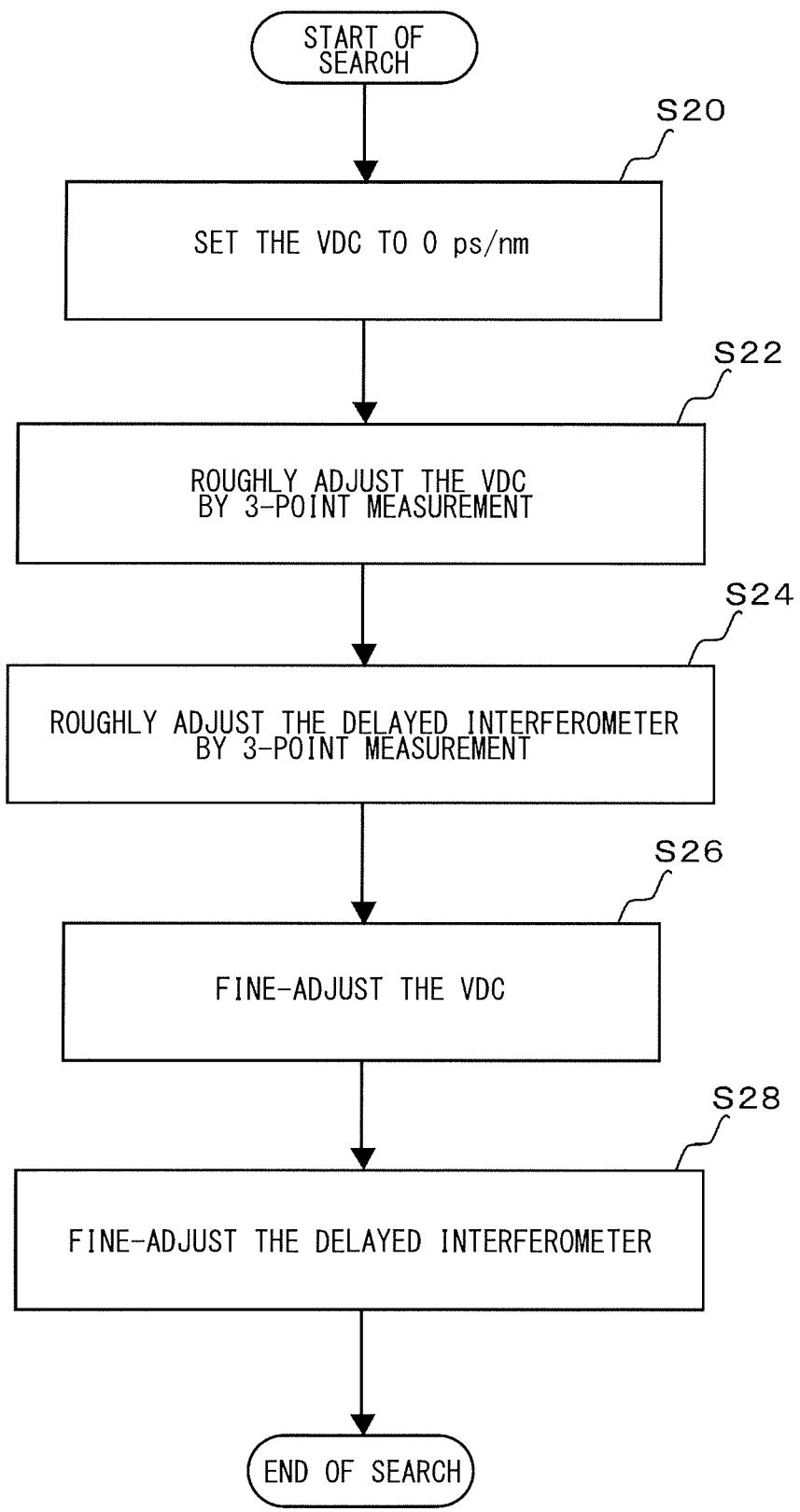
FIG. 11 is a flowchart showing an example of a search for optimal points of a dispersion compensation amount and an optical phase control amount.

FIG. 11 is a flowchart showing an example of a search for optimal points of the dispersion compensation amount and the optical phase control amount in Step S12. The control unit 17 first sets the dispersion compensation amount for the variable dispersion compensator 11 to 0 ps/nm (S20). Then the control unit 17 starts coarse adjustment of the variable dispersion compensator 11 (S22). In this coarse adjustment, the dispersion compensation amount for the variable dispersion compensator 11 is set to three measurement points of 0 ps/nm and ±400 ps/nm, for instance. By comparing the number of error occurrences for the respective measurement points with one another, a dispersion compensation amount for which the number of error occurrences becomes minimum is set as a center point for the next measurement. Now, three measurement points of the center point set in the previous adjustment and ±200 ps/nm, which are the half of the previous ones, from this center point are set; the number of error occurrences for these respective measurement points are compared with one another and a dispersion compensation amount for which the number of error occurrences becomes minimum is set as a center point for the next measurement. Similar process to the above process is repeated until three measurement points of the center point and ±50 ps/nm from the center point are set finally. That is, the number of error occurrences for the three respective measurement points of the center point and ±100 ps/nm, which are the half of the previous ones, from the center are compared with one another. Finally, the number of error occurrences for the three respective measurement points of the center and ±50 ps/nm, which are the half of the previous ones, from the center are compared with one another, and a dispersion compensation amount for which the number of error occurrences becomes minimum is set as the optimal point in the coarse adjustment.

Then, the control unit 17 starts coarse adjustment of the delayed interferometer 13. Similar to the above-described coarse adjustment of the variable dispersion compensator 11, the coarse adjustment of the delayed interferometer 13 is conducted as follows. The optical phase control amount for the delayed interferometer 13 is set to three measurement points of an initial value and $\pm\pi$ from this initial value, for instance. By comparing the number of error occurrences for the respective measurement points with one another, an optical phase control amount for which the number of error occurrences becomes minimum is set as a center point for the next measurement. Then, three measurement points of the center point set in the previous adjustment and $\pm\pi/2$ from this center point are set; the number of error occurrences for these respective measurement points are compared with one another and an optical phase control amount for which the number of error occurrences becomes minimum is set as a center point for the next measurement. Finally, the number of error occurrences for the three measurement points of the center point and $\pm\pi/4$ from the center point are compared with one another, and an optical phase control amount for which the number of error occurrences becomes minimum is set as the optimal point in the coarse adjustment.

Then, the control unit 17 starts fine adjustment of the variable dispersion compensator 11 (S26). In this fine adjustment, the dispersion compensation amount is varied sequentially at intervals of 5 ps/nm from the optimal point set by the coarse adjustment of Step S22 and continues to be adjusted up to a point where the number of error occurrences becomes minimum.

Then, the control unit 17 starts fine adjustment of the delayed interferometer 13 (S28). In this fine adjustment, the optical phase control amount is varied sequentially at intervals of a few degrees from the optimal point set by the coarse adjustment of Step S24 and continues to be adjusted up to a point where the number of error occurrences becomes minimum. Upon completion of the fine adjustment of the delayed interferometer 13, the current procedure proceeds to Step S14 by returning to the procedure of FIG. 10.

Figure 10:
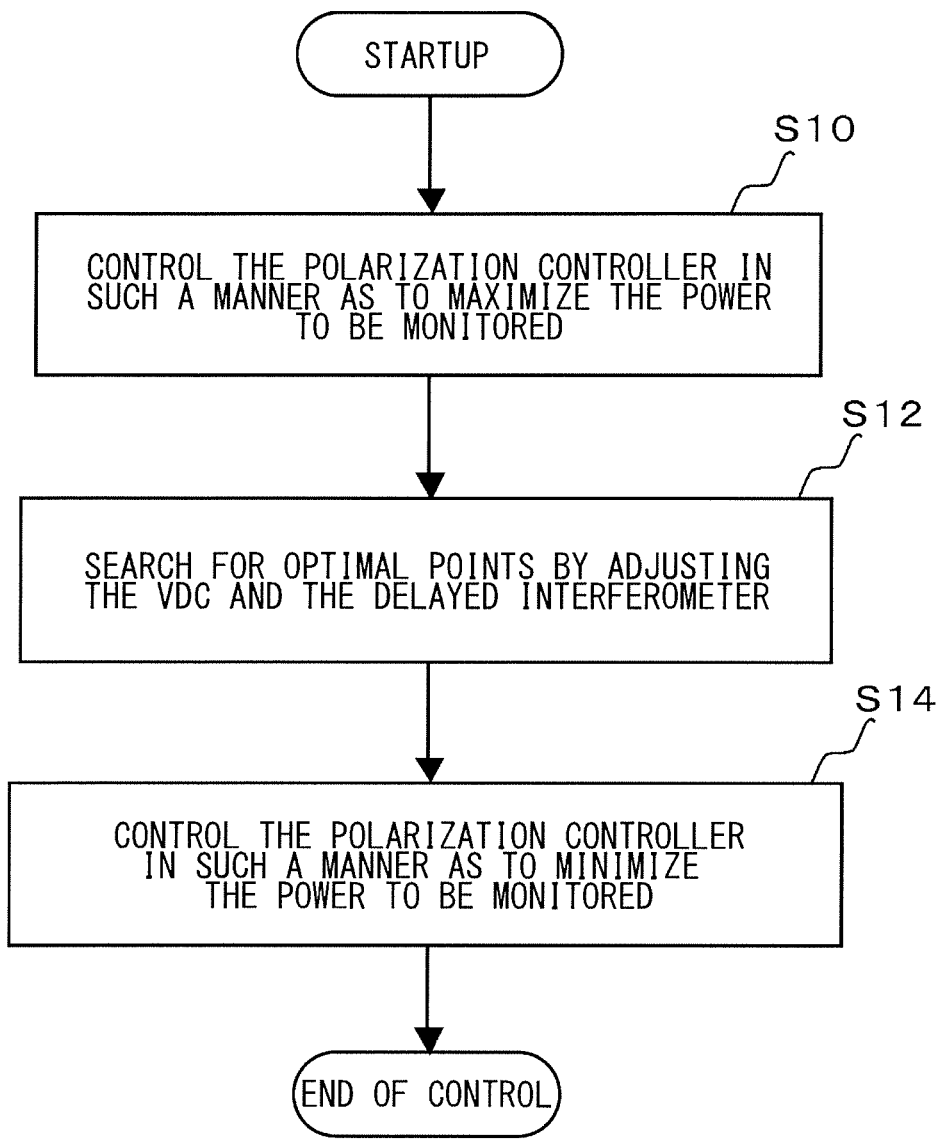
FIG. 10 is a flowchart showing an example of a specific control method in a first embodiment.

In Step S14 of FIG. 10, the control unit 17 controls the polarization controller 21 in such a manner as to minimize the power monitored by the photodiode 25 (S14). As a result, the polarization state of the optical signal inputted to the photoelectric converter 14 is controlled into the polarization state least likely to cause errors. The completion of Step S14 completes the optimization control of the polarization control unit 20, the variable dispersion compensator 11 and the delayed interferometer 13 at the startup of the apparatus.

By employing the optical receiving apparatus 10 according to the first embodiment, a high number of errors is efficiently monitored in a short time by controlling the polarization state of the optical signal inputted to the photoelectric converter 14. As a result, it is possible to shorten the time that is required in optimizing the variable dispersion compensator 11 and the delayed interferometer 13. Further, after completing the optimization control of the variable dispersion compensator 11 and the delayed interferometer 13, the polarization state of the optical signal inputted to the photoelectric converter is optimized, so that the adverse effect of the polarization mode dispersion can be suppressed.

Figure 12:
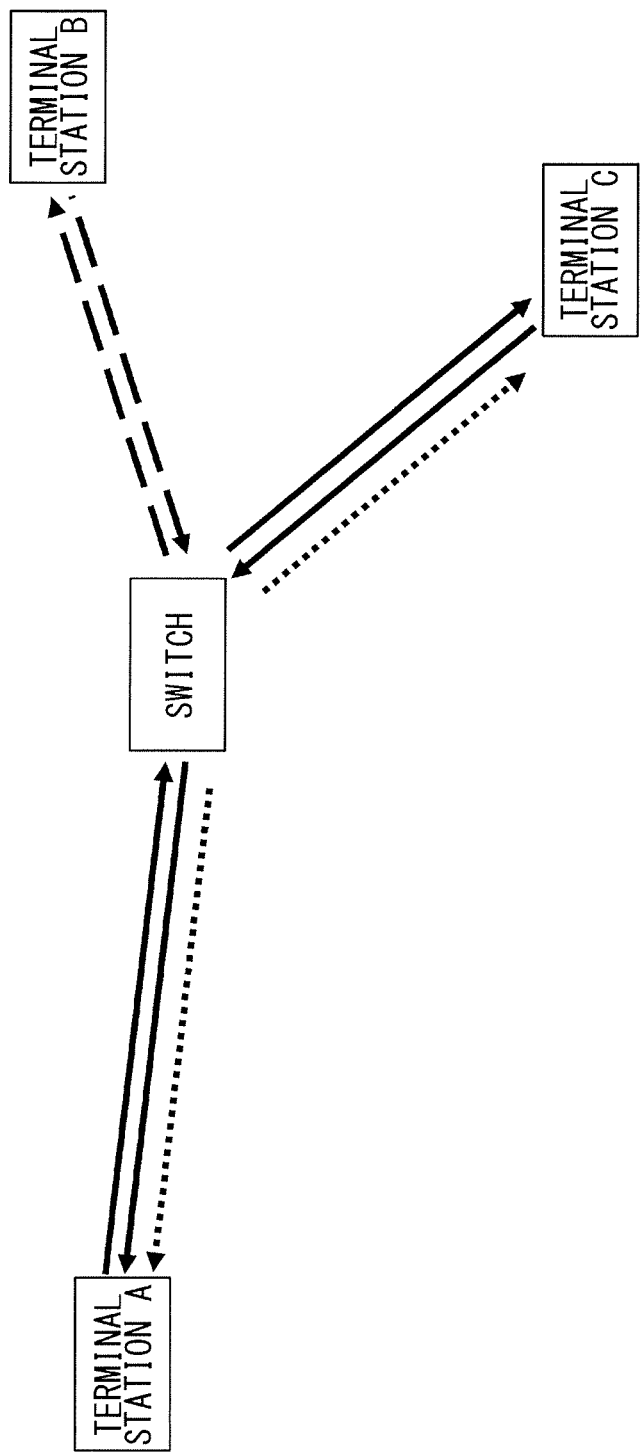
FIG. 12 shows an exemplary network configuration concerning a first embodiment.

In the above-described first embodiment, a description is given of a case where the optimization control of the polarization control unit 20, the variable dispersion compensator 11 and the delayed interferometer 13 is performed at the startup of the apparatus. However, the timing with which the optimization operation is performed is not limited to the startup timing. For example, consider a configuration of a network where the paths connecting a plurality of terminal stations A, B and C as shown in FIG. 12 are switched by a switch. In such a network, when the paths are switched, conditions such as the length, temperature and moisture of a transmission path fiber vary and therefore it is required to adjust again the set points of the variable dispersion compensator 11 and the delayed interferometer 13 at the receiving end.

Thus, there may be provided a monitoring unit for monitoring the occurrence and recovery of loss-of-light (LOL) information generated with the timing when the path is switched, for instance. And a configuration may be such that whenever the occurrence and recovery of LOL information is monitored by the monitoring unit, the optimization control as described in conjunction with FIG. 10 and FIG. 11 is automatically performed again. If the optical receiving apparatus is equipped with such a monitoring function as described above, the setting of the optical receiving apparatus can be automatically optimized by only switching the switch when the path is to be switched.

Figure 13:
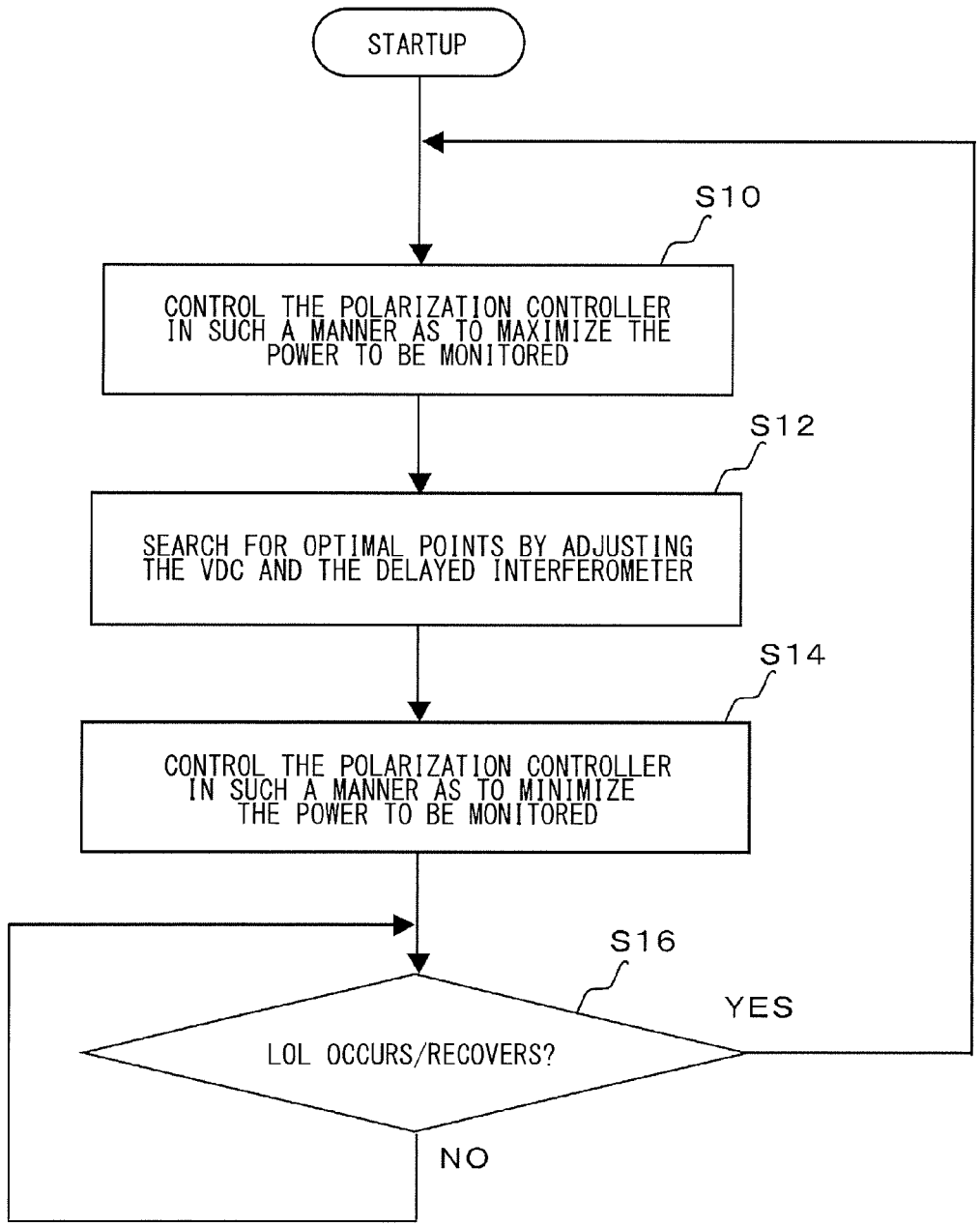
FIG. 13 is a flowchart showing an example of a control method applied to the network configuration of FIG. 12.

FIG. 13 is a flowchart showing an example of a control method applied to the network configuration of FIG. 12. The flowchart shown in FIG. 13 is one with Step S16 added to the flowchart of FIG. 10. After completing Step S14, the occurrence and recovery of LOL information is determined in STEP S16. If the occurrence and recovery of LOL information is detected, a return will be made to Step S10 and a readjustment will be started (YES of S16). If, on the other hand, the occurrence and recovery of LOL information is not detected, wait ready until the occurrence and recovery of LOL information is detected (NO of S16).

In the above-described first embodiment, when the apparatus is started by a power-on, the polarization state of the optical signal is adjusted to the polarization state most likely to cause errors, by controlling the polarization controller 21 to maximize the power monitored by the photodiode 25. However, the polarization state is not limited to one most likely to cause errors, and as long as it is a state where errors are, at least, more likely to occur than in normal operation, it is possible to shorten the time that is required in optimizing the variable dispersion compensator 11 and the delayed interferometer 13. For example, if the error rate in normal operation is at or below $1\times10^{-12}$, the state will be adjusted to a polarization state where the error rate is about $1\times10^{-9}$ even though the dispersion compensation amount and the optical phase control amount are at their optimal points. Thus, the dispersion compensation amount and the optical phase control amount can be controlled in a short time. After completing the optimization control of the variable dispersion compensator 11 and the delayed interferometer 13, the adjustment is made to a polarization state less likely to cause errors, such as a polarization state where the error rate is at or below $1\times10^{-12}$, so that the adverse effect of the polarization mode dispersion can be suppressed.

Figure 14:
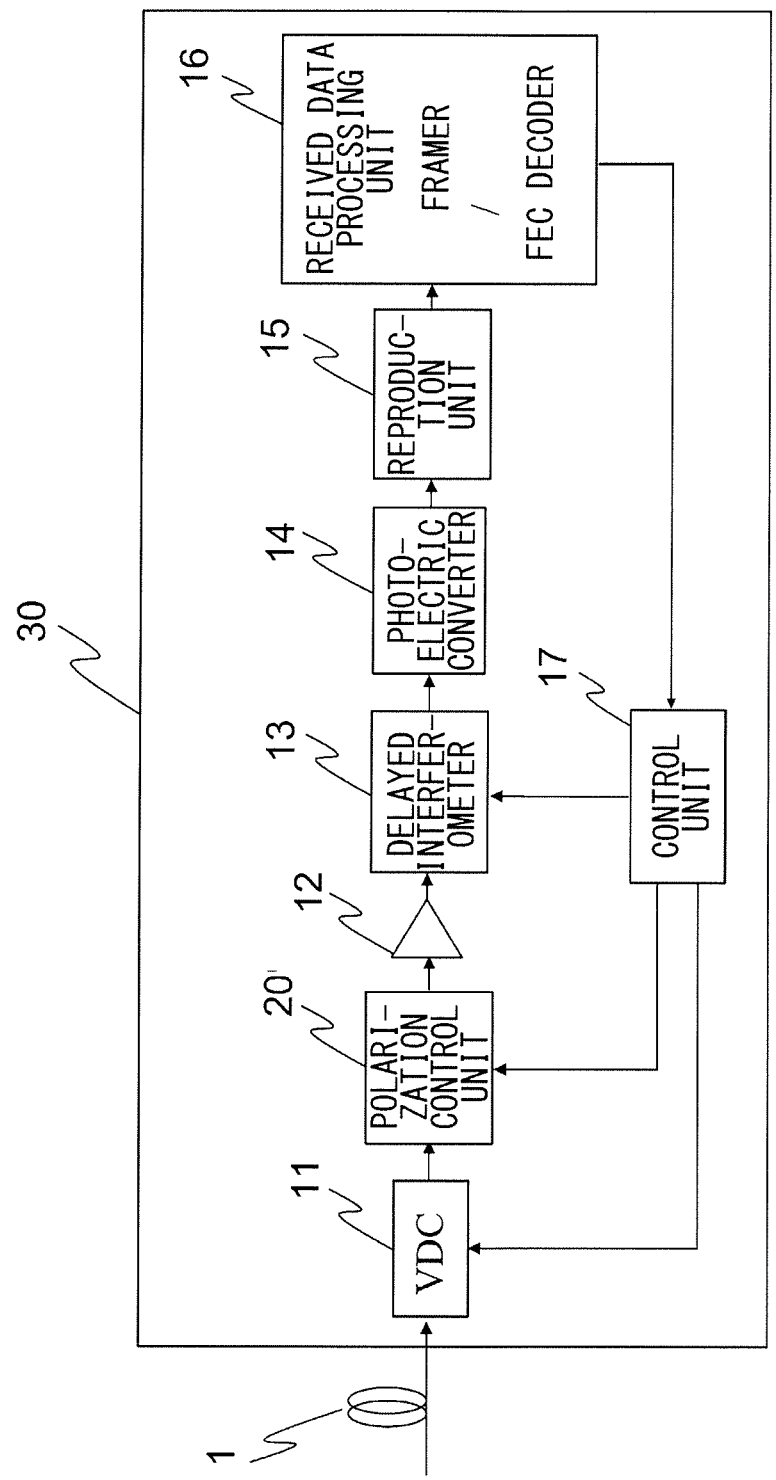
FIG. 14 is a block diagram showing a structure of an optical receiving apparatus according to a second embodiment of the present invention.
Figure 15:
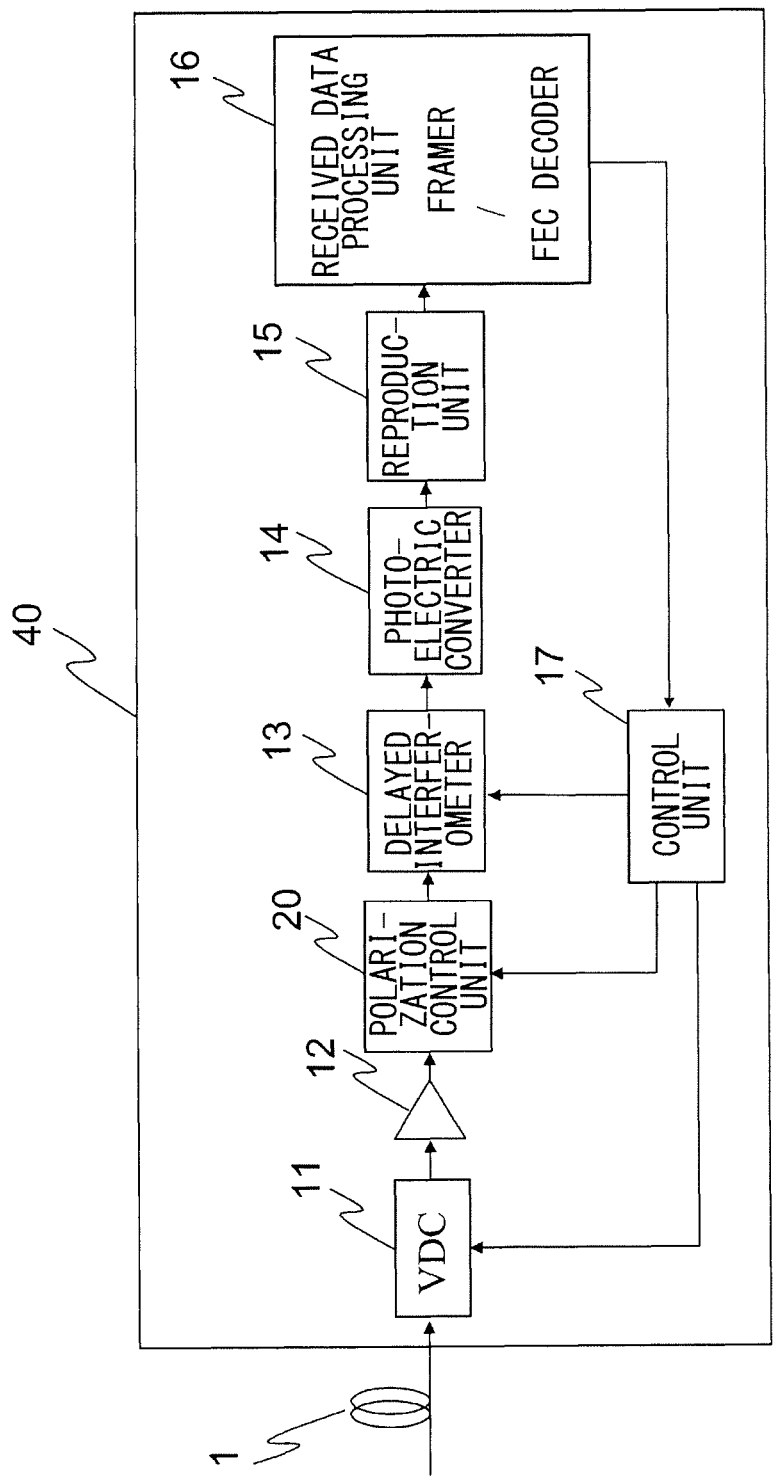
FIG. 15 is a block diagram showing a structure of an optical receiving apparatus according to a third embodiment of the present invention.
Figure 16:
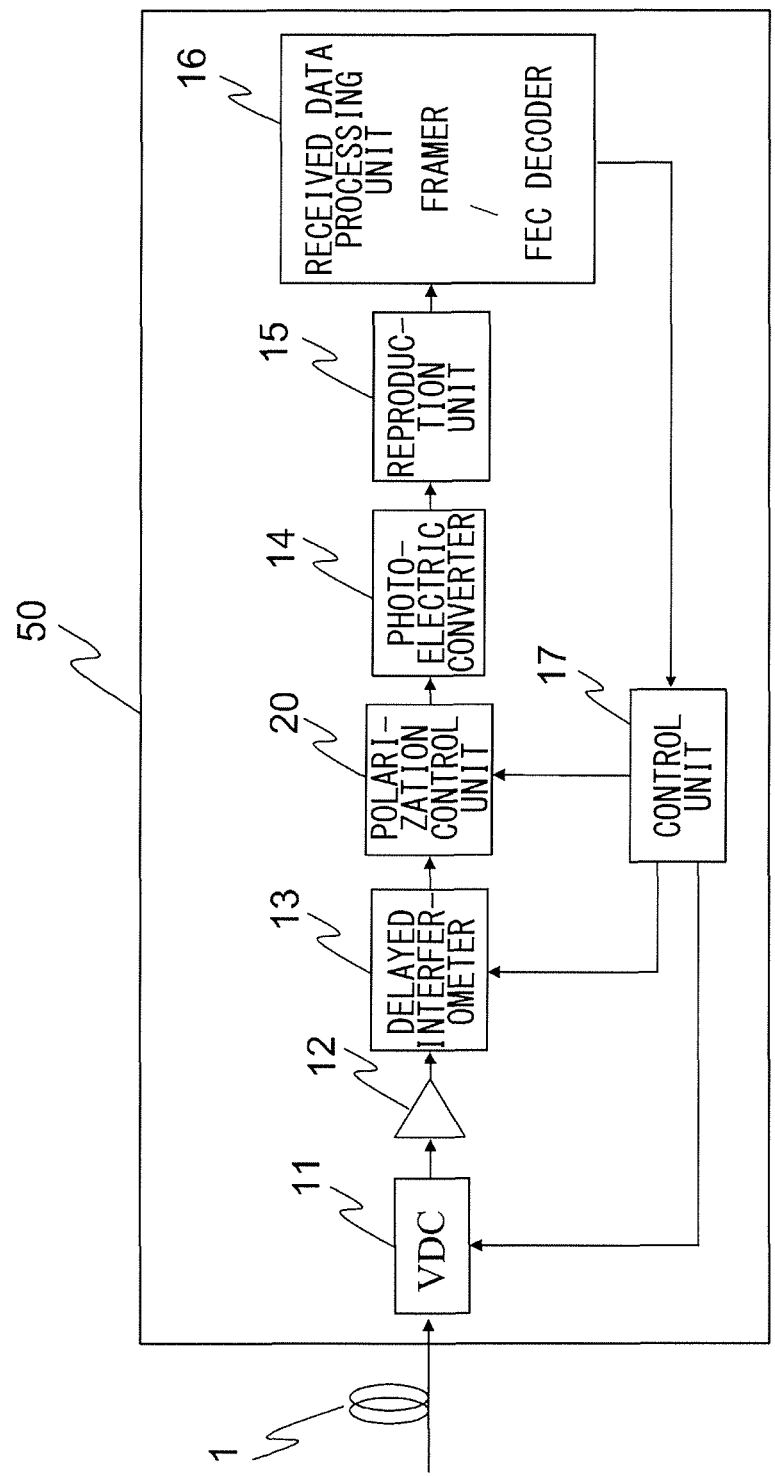
FIG. 16 is a block diagram showing a structure of an optical receiving apparatus according to a fourth embodiment of the present invention.

FIG. 14 is a block diagram showing a structure of an optical receiving apparatus 30 according to a second embodiment of the present invention. The optical receiving apparatus 30 according to the second embodiment differs from the optical receiving apparatus 10 according to the first embodiment as shown in FIG. 8 in that the polarization control unit 20 is provided subsequent to the variable dispersion compensator 11. FIG. 15 is a block diagram showing a structure of an optical receiving apparatus 40 according to a third embodiment of the present invention. The optical receiving apparatus 40 according to the third embodiment differs from the optical receiving apparatus 10 according to the first embodiment as shown in FIG. 8 in that the polarization control unit 20 is provided subsequent to the optical amplifier 12. FIG. 16 is a block diagram showing a structure of an optical receiving apparatus 50 according to a fourth embodiment of the present invention. The optical receiving apparatus 50 according to the fourth embodiment differs from the optical receiving apparatus 10 according to the first embodiment as shown in FIG. 8 in that the polarization control unit 20 is provided subsequent to the delayed interferometer 13.

Since the polarization control unit 20 is controlled by monitoring the power of the optical signal, it can be controlled independently of the demodulation status of the main signal. Thus, as illustrated in the second to fourth embodiments, as long as the polarization control unit 20 is provided anterior to the photoelectric converter 14, the same advantageous effects as those of the first embodiment can be achieved no matter where it is provided.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. An optical receiving apparatus, comprising:
 a variable dispersion compensation unit configured to compensate for a wavelength dispersion of an inputted optical signal of a differential M-phase modulation scheme, where M=2n and n is a natural number;
 a delay interference unit configured to perform a delay interference process on the optical signal dispersion-compensated by the variable dispersion compensation unit, the delay interference process causing interference between a branch component delayed by one bit and an optical-phase-controlled branch component;
 a photoelectric converter configured to perform a photoelectric conversion on the optical signal from the delay interference unit, so as to output a demodulated electrical signal corresponding to the differential M-phase modulation scheme;
 a polarization control unit configured to control a polarization state of the optical signal inputted to the photoelectric converter;

an error monitor unit configured to monitor a number of error occurrences of the electrical signal outputted from the photoelectric converter; and a control unit configured to control a dispersion compensation amount at the variable dispersion compensation unit and an optical phase control amount at the delay interference unit, based on information on the number of error occurrences from the error monitor unit, wherein the control unit is configured to adjust the polarization state of the optical signal inputted to the photoelectric converter to a first polarization state, in which errors are more likely to occur than in normal operation, by controlling the polarization control unit and then start control of the variable dispersion compensation unit and the delay interference unit, and upon completion of the control, is configured to adjust the polarization state of the optical signal to a second polarization state, in which errors are less likely to occur than in the first polarization state, by controlling the polarization control unit, the polarization control unit including:

a polarization controller capable of converting a polarization state of an inputted optical signal to an arbitrary polarization state;

a polarizer for transmitting one polarization component of orthogonal polarization components of an optical signal having passed through the polarization controller; and an optical power monitor unit for monitoring power of the optical signal having passed through the polarizer, wherein the control unit adjusts a polarization state of an optical signal inputted to the photoelectric converter to the first polarization state by controlling the polarization controller to maximize the power to be monitored by the optical power monitor unit.

2. An optical receiving apparatus according to claim 1, wherein the control unit controls the dispersion compensation amount and the optical phase control amount to minimize the number of error occurrences to be detected by the error monitor unit.

3. An optical receiving apparatus according to claim 1, wherein the control unit adjusts the polarization state of an optical signal inputted to the photoelectric converter to the second polarization state by controlling the polarization controller to minimize the power to be monitored by the optical power monitor unit.

4. An optical receiving apparatus according to claim 1, further comprising a monitoring unit configured to monitor information on a disconnection of input of the optical signal to the optical receiving apparatus and a recovery thereof, wherein when the information is detected by the monitoring unit, the control unit is configured to adjust the polarization state of the optical signal inputted to the photoelectric converter to the first polarization state, in which errors are more likely to occur than in normal operation, by controlling the polarization control unit and then start control of the variable dispersion compensation unit and the delay interference unit, and upon completion of the control, is configured to adjust the polarization state of the optical signal to the second polarization state, in which errors are less likely to occur than in the first polarization state, by controlling the polarization control unit.

5. An optical transmission system, comprising:

an optical transmitting apparatus configured to generate an optical signal of a differential M-phase modulation scheme and output the generated optical signal to an optical transmission path, where M=2n and n is a natural number; and an optical receiving apparatus configured to perform receiving processing on the optical signal transmitted through the optical transmission path, the optical receiving apparatus including:

a variable dispersion compensation unit configured to receive the input of the optical signal transmitted through the optical transmission path and compensate for a wavelength dispersion of the inputted optical signal;

a delay interference unit configured to perform a delay interference process on the optical signal dispersion-compensated by the variable dispersion compensation unit, the delay interference process causing interference between a branch component delayed by one bit and an optical-phase-controlled branch component;

a photoelectric converter configured to perform a photoelectric conversion on the optical signal from the delay interference unit, so as to output a demodulated electrical signal corresponding to the differential M-phase modulation scheme;

a polarization control unit configured to control a polarization state of the optical signal inputted to the photoelectric converter;

an error monitor unit configured to monitor the number of error occurrences of the electrical signal outputted from the photoelectric converter; and a control unit configured to control a dispersion compensation amount at the variable dispersion compensation unit and an optical phase control amount at the delay interference unit, based on information on the number of error occurrences from the error monitor unit, wherein the control unit is configured to adjust the polarization state of the optical signal inputted to the photoelectric converter to a first polarization state, in which errors are more likely to occur than in normal operation, by controlling the polarization control unit and then start control of the variable dispersion compensation unit and the delay interference unit, and upon completion of the control, is configured to adjust the polarization state of the optical signal to a second polarization state, in which errors are less likely to occur than in the first polarization state, by controlling the polarization control unit, the polarization control unit including:

a polarization controller capable of converting a polarization state of an inputted optical signal to an arbitrary polarization state;

a polarizer for transmitting one polarization component of orthogonal polarization components of an optical signal having passed through the polarization controller; and an optical power monitor unit for monitoring power of the optical signal having passed through the polarizer, wherein the control unit adjusts a polarization state of an optical signal inputted to the photoelectiric converter to the first polarization state by controlling the polarization controller to maximize the power to be monitored by the optical power monitor unit.

6. An optical transmission system according to claim 5, wherein the control unit controls the dispersion compensation amount and the optical phase control amount to minimize the number of error occurrences to be detected by the error monitor unit.

7. An optical transmission system according to claim 5, wherein the control unit adjusts the polarization state of an optical signal inputted to the photoelectric converter to the second polarization state by controlling the polarization controller to minimize the power to be monitored by the optical power monitor unit.

8. An optical transmission system according to claim 5, the optical receiving apparatus further comprising a monitoring unit configured to monitor information on a disconnection of input of the optical signal to the optical receiving apparatus and a recovery thereof,
    wherein when the information is detected by the monitoring unit, the control unit is configured to adjust the polarization state of the optical signal inputted to the photoelectric converter to the first polarization state, in which errors are more likely to occur than in normal operation, by controlling the polarization control unit and then start control of the variable dispersion compensation unit and the delay interference unit, and upon completion of the control, is configured to adjust the polarization state of the optical signal to the second polarization state, in which errors are less likely to occur than in the first polarization state, by controlling the polarization control unit.

* * * * *